United States Patent
Sin et al.

(10) Patent No.: US 11,609,596 B2
(45) Date of Patent: Mar. 21, 2023

(54) ELECTRONIC DEVICE FOR CONTROLLING FREQUENCY OF PROCESSOR AND METHOD OF OPERATING THE SAME

(71) Applicant: Samsung Electronics Co., Ltd., Gyeonggi-do (KR)

(72) Inventors: Youngcheol Sin, Gyeonggi-do (KR); Daehyun Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/983,090

(22) Filed: Aug. 3, 2020

(65) Prior Publication Data

US 2021/0041907 A1 Feb. 11, 2021

(30) Foreign Application Priority Data

Aug. 5, 2019 (KR) .................. 10-2019-0094960

(51) Int. Cl.
*G06F 1/04* (2006.01)
(52) U.S. Cl.
CPC ..................... *G06F 1/04* (2013.01)
(58) Field of Classification Search
CPC ............. G06F 1/04; G06F 1/08; G06F 1/3206
See application file for complete search history.

(56) References Cited

U.S. PATENT DOCUMENTS

| | | | |
|---|---|---|---|
| 6,882,952 B1 | 4/2005 | Hadley et al. | |
| 8,621,253 B1 * | 12/2013 | Brown ................. | G06F 1/324 713/320 |
| 2008/0288748 A1 | 11/2008 | Sutardja et al. | |
| 2009/0113178 A1 | 4/2009 | Kim et al. | |
| 2010/0312991 A1 | 12/2010 | Norden et al. | |
| 2014/0019656 A1 | 1/2014 | Hum et al. | |
| 2014/0136823 A1 * | 5/2014 | Ragland .............. | G06F 9/44505 713/1 |
| 2014/0281613 A1 | 9/2014 | Kaito | |
| 2015/0205636 A1 * | 7/2015 | Kulkarni .............. | G06F 9/4881 718/103 |
| 2016/0364276 A1 | 12/2016 | Wu et al. | |
| 2017/0031430 A1 * | 2/2017 | Ansorregui ........... | G06F 1/3206 |
| 2018/0095792 A1 * | 4/2018 | Chien ................... | G06F 9/4893 |
| 2018/0173675 A1 | 6/2018 | Tamir et al. | |
| 2018/0181188 A1 * | 6/2018 | Park ..................... | G06F 11/302 |
| 2018/0217659 A1 * | 8/2018 | Williamson ......... | G06F 9/5094 |

OTHER PUBLICATIONS

International Search Report dated Oct. 26, 2020.
European Search Report dated Apr. 13, 2022.

* cited by examiner

*Primary Examiner* — Jaweed A Abbaszadeh
*Assistant Examiner* — Hyun Soo Kim
(74) *Attorney, Agent, or Firm* — Cha & Reiter, LLC

(57) ABSTRACT

An electronic device according to an embodiment includes a display, and a processor including a plurality of cores, wherein the processor is configured to identify a first application satisfying a designated condition related to boosting of the processor among at least one application running on the electronic device, identify a first instruction set architecture (ISA) of the first application, and boost a frequency of a clock signal applied to at least one core among the plurality of cores included in the processor according to the first instruction set architecture.

15 Claims, 14 Drawing Sheets

[64 BIT]

| CORE | FREQUENCY (Khz) | PERFORMANCE | POWER CONSUMPTION |
|---|---|---|---|
| BIG CORE | 2730000 | 1024 | 2042 |
| | 2600000 | 975 | 1789 |
| | 2470000 | 926 | 1499 |
| | 2340000 | 878 | 1259 |
| | 2236000 | 839 | 1137 |
| | 2080000 | 780 | 984 |
| | 1976000 | 741 | 868 |
| | 1820000 | 683 | 716 |
| | 1664000 | 624 | 613 |
| | 1560000 | 585 | 537 |
| | 1456000 | 546 | 476 |
| | 1378000 | 517 | 434 |
| | 1248000 | 468 | 366 |
| | 1144000 | 429 | 329 |
| | 1040000 | 390 | 271 |
| | 936000 | 351 | 235 |
| | 819000 | 307 | 193 |
| | 728000 | 273 | 168 |
| MEDIUM-SIZED CORE | 2314000 | 513 | 688 |
| | 2210000 | 490 | 587 |
| | 2106000 | 467 | 510 |
| | 2002000 | 444 | 453 |
| | 1898000 | 421 | 400 |
| | 1794000 | 398 | 351 |
| | 1690000 | 375 | 301 |
| | 1586000 | 352 | 265 |
| | 1508000 | 334 | 244 |
| | 1404000 | 311 | 212 |
| | 1222000 | 271 | 169 |
| | 1066000 | 236 | 132 |
| | 962000 | 213 | 111 |
| | 845000 | 187 | 93 |
| | 754000 | 167 | 80 |
| | 650000 | 144 | 63 |
| | 507000 | 112 | 48 |
| LITTLE CORE | 1950000 | 251 | 334 |
| | 1846000 | 238 | 292 |
| | 1742000 | 224 | 253 |
| | 1586000 | 204 | 184 |
| | 1456000 | 188 | 148 |
| | 1300000 | 167 | 119 |
| | 1157000 | 149 | 94 |
| | 1053000 | 136 | 79 |
| | 949000 | 122 | 65 |
| | 806000 | 104 | 50 |
| | 650000 | 84 | 35 |
| | 546000 | 70 | 27 |
| | 442000 | 57 | 21 |

FIG.6A

[32 BIT]

| CORE | FREQUENCY (Khz) | PERFORMANCE | POWER CONSUMPTION |
|---|---|---|---|
| BIG CORE | 2730000 | 590 | 1300 |
| | 2600000 | 562 | 1139 |
| | 2470000 | 533 | 954 |
| | 2340000 | 505 | 801 |
| | 2236000 | 483 | 724 |
| | 2080000 | 449 | 627 |
| | 1976000 | 427 | 552 |
| | 1820000 | 393 | 456 |
| | 1664000 | 359 | 390 |
| | 1560000 | 337 | 342 |
| | 1456000 | 314 | 303 |
| | 1378000 | 298 | 277 |
| | 1248000 | 270 | 233 |
| | 1144000 | 247 | 209 |
| | 1040000 | 225 | 173 |
| | 936000 | 202 | 149 |
| | 819000 | 117 | 123 |
| | 728000 | 157 | 107 |
| MEDIUM-SIZED CORE | 2314000 | 491 | 652 |
| | 2210000 | 469 | 556 |
| | 2106000 | 447 | 483 |
| | 2002000 | 425 | 429 |
| | 1898000 | 403 | 378 |
| | 1794000 | 381 | 332 |
| | 1690000 | 359 | 285 |
| | 1586000 | 337 | 251 |
| | 1508000 | 320 | 231 |
| | 1404000 | 298 | 201 |
| | 1222000 | 259 | 160 |
| | 1066000 | 226 | 125 |
| | 962000 | 204 | 105 |
| | 845000 | 179 | 88 |
| | 754000 | 160 | 76 |
| | 650000 | 138 | 60 |
| | 507000 | 108 | 46 |
| LITTLE CORE | 1950000 | 236 | 307 |
| | 1846000 | 224 | 267 |
| | 1742000 | 211 | 232 |
| | 1586000 | 192 | 168 |
| | 1456000 | 177 | 136 |
| | 1300000 | 158 | 109 |
| | 1157000 | 140 | 87 |
| | 1053000 | 128 | 72 |
| | 949000 | 115 | 60 |
| | 806000 | 98 | 46 |
| | 650000 | 79 | 32 |
| | 546000 | 66 | 25 |
| | 442000 | 54 | 19 |

| BOOST TABLE | | |
|---|---|---|
| BIG CORE | MEDIUM-SIZED CORE | LITTLE CORE |
| 2912000 | 2314000 | 1950000 |
| 2808000 | 2314000 | 1950000 |
| 2730000 | 2314000 | 1950000 |
| 2600000 | 2314000 | 1950000 |
| 2530000 | 2314000 | 1950000 |
| 2470000 | 2314000 | 1950000 |
| 2340000 | 2314000 | 1950000 |
| 2236000 | 2314000 | 1950000 |
| 2080000 | 2210000 | 0 |
| 1976000 | 2210000 | 0 |
| 1820000 | 2210000 | 0 |
| 1664000 | 2210000 | 0 |
| 1560000 | 2210000 | 0 |
| 1456000 | 2106000 | 0 |
| 1378000 | 2002000 | 0 |
| 1248000 | 1794000 | 0 |
| 1144000 | 1690000 | 0 |
| 1040000 | 1508000 | 0 |
| 936000 | 1404000 | 0 |
| 819000 | 1222000 | 0 |
| 728000 | 1066000 | 0 |
| 624000 | 962000 | 0 |
| 520000 | 754000 | 0 |

FIG.7A

ELECTRONIC DEVICE FOR CONTROLLING FREQUENCY OF PROCESSOR AND METHOD OF OPERATING THE SAME

CROSS-REFERENCE TO RELATED APPLICATION(S)

This application is based on and claims priority under 35 U.S.C. 119 to Korean Patent Application No. 10-2019-0094960, filed on Aug. 5, 2019, in the Korean Intellectual Property Office, the disclosure of which is herein incorporated by reference in its entirety.

TECHNICAL FIELD

One or more embodiments of the instant disclosure generally relates to an electronic device for controlling the frequency of its processor and a method of operating the same.

BACKGROUND

Recently, the use of electronic devices or mobile communication terminals such as tablet PCs, smart phones, smart watches, etc., is becoming common, and these electronic devices or mobile communication terminals may perform various functions such as image capture, music playback, video playback, games, as well as wireless communication functions. Accordingly, a user can use various applications of the electronic devices or mobile communication terminals. For each of the various applications, the electronic device or the mobile communication terminal should provide optimized performance so as to be quickly response. The electronic device or mobile communication terminal may use a CPU frequency boosting function to provide the optimized performance. For example, the mobile communication terminal may boost the frequency of the CPU to a specific frequency value and increase the processing speed of the task for the application, when fast response to the application is required.

An instruction set architecture (ISA) may mean machine language instructions that can be recognized by a microprocessor. The microprocessor can analyze the instructions of the ISA and perform specific functions corresponding to the analyzed instructions.

The above information is presented as background information only to assist with an understanding of the disclosure. No determination has been made, and no assertion is made, as to whether any of the above might be applicable as prior art with regard to the disclosure.

SUMMARY

The frequency boosting of the CPU performed in existing mobile communication terminals does not consider the instruction set architecture (ISA) of the application. That is, in existing mobile communication terminals, the frequency value to be boosted is determined without considering the characteristics of the design in which the performance and power consumption of the CPU's frequency booster may be different for each instruction set architecture (ISA). For this reason, in applications having different types of instruction set architecture (ISA), one application having a particular instruction set architecture (ISA) may cause performance degradation when frequency boosting is performed.

As such, when existing mobile communication terminals do not consider the instruction set architecture (ISA) of the application, they cannot provide optimal performance to process task of the applications and can consume a lot of power when performing frequency boosting.

An electronic device according to an embodiment includes a display, and a processor including a plurality of cores, wherein the processor is configured to: identify a first application satisfying a designated condition related to boosting of the processor among at least one application running on the electronic device; identify a first instruction set architecture (ISA) of the first application; and boost a frequency of a clock signal applied to at least one core among the plurality of cores included in the processor according to the first instruction set architecture.

An operation method of an electronic device according to an embodiment includes: identifying a first application satisfying a designated condition related to boosting of a processor among at least one application running on the electronic device; identifying a first instruction set architecture (ISA) of the first application; and boosting a frequency of a clock signal applied to at least one core among a plurality of cores included in the processor of the electronic device according to the first instruction set architecture.

A computer-readable recording medium according to an embodiment may store a program capable of executing the operations of: identifying a first application satisfying a designated condition related to boosting of a processor among at least one application running on an electronic device; identifying a first instruction set architecture (ISA) of the first application; and boosting a frequency of a clock signal applied to at least one core among a plurality of cores included in the processor of the electronic device according to the first instruction set architecture.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of the disclosure will be more apparent from the following detailed description taken in conjunction with the accompanying drawings, in which:

FIG. 6A is a table used by an electronic device to determine a frequency value for boosting according to an embodiment, and FIG. 6B is a table used by an electronic device to determine a frequency value for boosting according to an embodiment;

FIG. 7A is a table for frequency boosting of each of the cores included in the processor, according to an embodiment;

DETAILED DESCRIPTION

Certain embodiments disclosed herein can provide an electronic device capable of increasing the frequency boosting efficiency for rapidly processing applications having different types of instruction set architecture (ISA) and reducing power consumption and a method of operating the same by controlling the clock frequency of the processor, based on the instruction set architecture (ISA) of the application of the processor.

The electronic device according to one or more embodiments can increase the processing speed of applications and reduce power consumption by controlling the frequency value for frequency boosting of the processor, based on the instruction set architecture (ISA) of various application of the electronic device.

Figure 1:
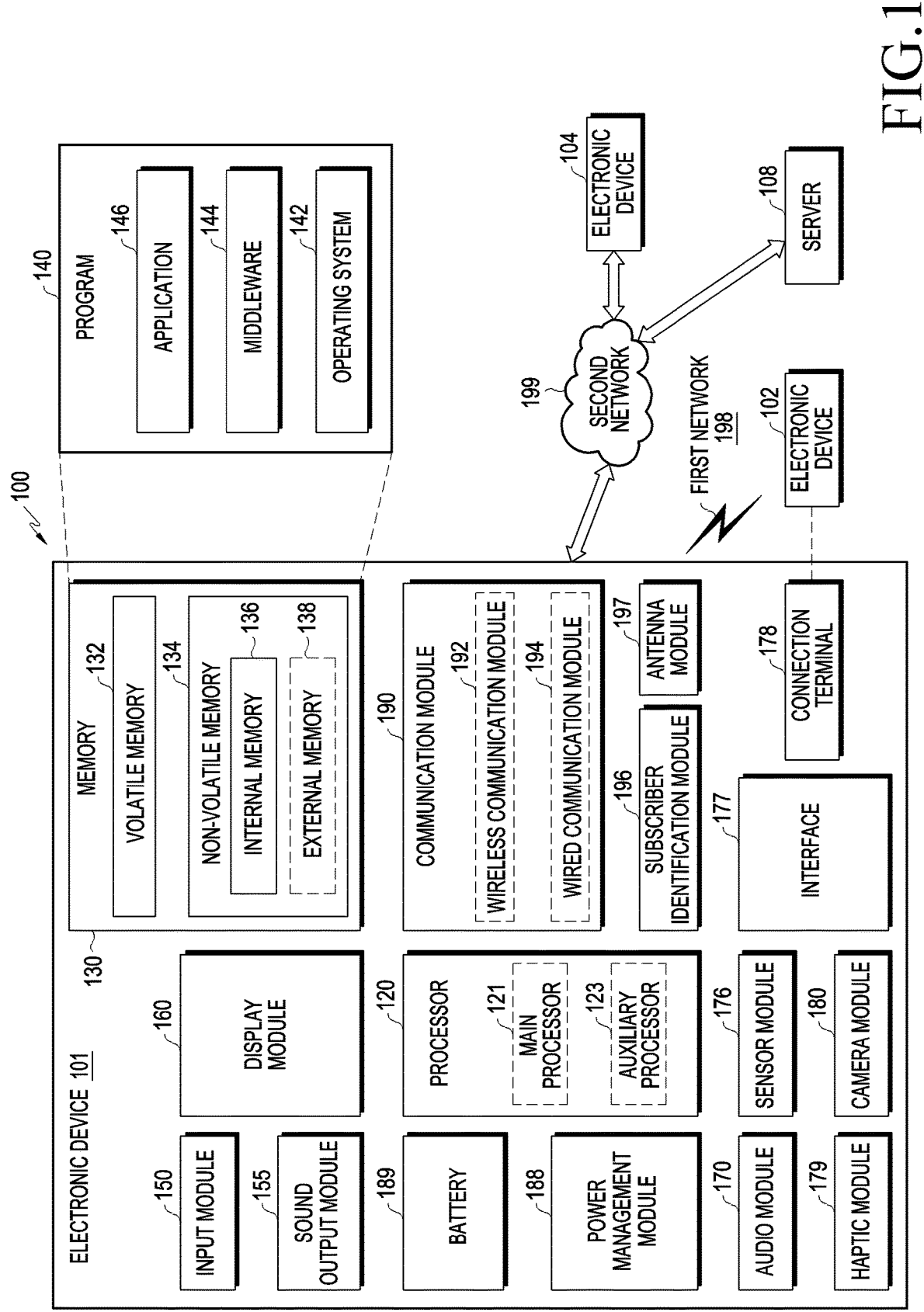
FIG. 1 is a block diagram of an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include a plurality of antennas. In such a case, at least one antenna appropriate for a communication scheme used in the communication network, such as the first network 198 or the second network 199, may be selected, for example, by the communication module from the plurality of antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
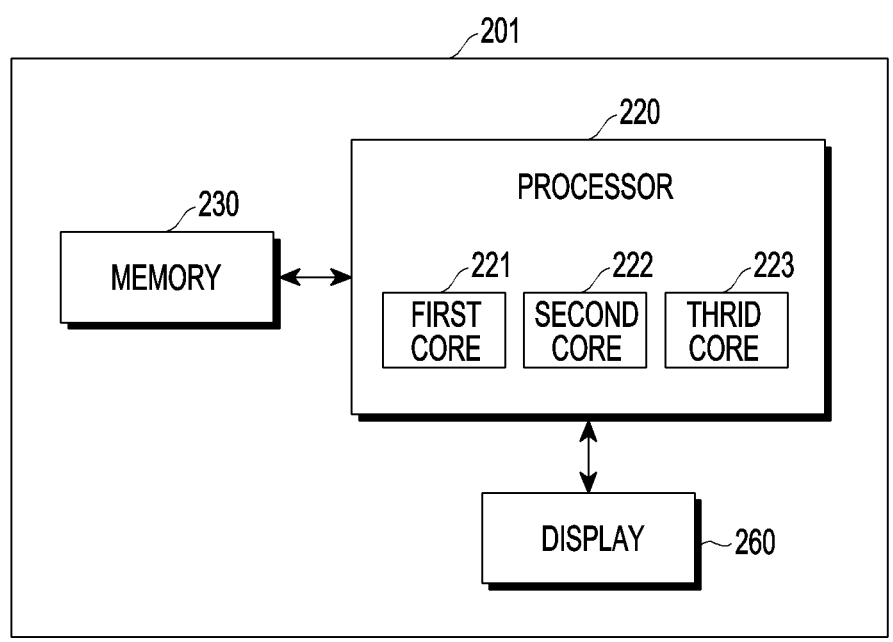
FIG. 2 is a schematic block diagram of an electronic device according to an embodiment.

FIG. 2 is a schematic block diagram of an electronic device according to an embodiment.

Referring to FIG. 2, the electronic device 201 may include a processor 220, a memory 230, and a display 260. The electronic device 201 may be implemented substantially the same as or similarly to the electronic device 101 or 102 of FIG. 1.

According to an embodiment, the processor 220 may control the overall operation of the electronic device 201. For example, the processor 220 may be implemented substantially the same as or similarly to the processor 120 of FIG. 1. The processor 220 or 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the processor 220 may include a plurality of cores (or clusters). For example, the processor 220 may include a first core 221, a second core 222, and a third core 223. For example, each of the first core 221, the second core 222, and the third core 223 may include at least one core (or a core processor). That is, in FIG. 2, although the processor 220 is illustrated to include only three cores, this only illustrates that the processor 220 includes three types of cores, and the number of cores included in the processor 220 may not be so limited. For example, the first core 221 may include at least one big core, the second core 222 may include at least one medium-sized core, and the third core 223 may include at least one little core. The core relatively larger in size may be a high performance processor, the medium-sized core may be a medium performance processor, and the little core may be a low performance processor. As such, the processor 220 may be implemented with heterogeneous core structure. The processor 220 may execute (or process) the application (or task of the application) using at least one core of the first core 221, the second core 222, and the third core 223 according to the workload of the application (or task of the application).

According to an embodiment, the processor 220 may identify an application or task of the application that needs (or requires) a boost. For example, the processor 220 may identify an application (or task of the application) that satisfies a designated condition related to the boosting of the processor 220. For example, the designated condition related to boosting may be a condition under which the boost is required, and may be automatically or manually designated by the processor 220. As more specific examples, tasks with the workload (e.g., CPU load degree or CPU load rate) greater than a designated value (or a value corresponding to a designated level), execution of an application (or a task of an application) configured to respond immediately, an application displayed at the top of the display 260, execution of an application (or a task of an application) with high job priority, a task of the currently activated application, and/or an application (or a task of an application) or the like corresponding to the user's input may satisfy the designated condition.

According to an embodiment, the processor 220 may identify an instruction set architecture (ISA) of the application when the application or task of the application that needs (or requires) a boost is identified. For example, the instruction set architecture may include a 32-bit instruction set architecture or a 64-bit instruction set architecture. For example, the processor 220 may identify which instruction set the application has using designated aspects of the application's software, such as 'primaryCpuAbi' and 'dalvik VMRuntime' in the 'ApplicationInfo Class' of the application, when the application is running in the Android™ operating system. That is, the processor 220 may identify or determine which of the 32-bit and 64-bit instruction sets the application has.

According to an embodiment, the processor 220 may identify the instruction set architecture of the application currently displayed on the top of the display 260, that is, displayed in the foreground of the display 260, whenever the application displayed on the top of the display 260 is changed. For example, when the application displayed on the top of the display 260 is changed, the processor 220 may generate a 'call' related to 'Activity Resume' and identify information of the newly changed application. Based on the information of the application, the processor 220 may identify which instruction set the application has.

According to an embodiment, the processor 220 may boost the processor 220 (or the frequency of the processor 220) according to the instruction set architecture (or instruction set structure). For example, boosting the processor 220 (or the frequency of the processor 220) may be an operation of boosting (or increasing) the frequency value of the clock signal applied to the processor 220. More specifically, boosting the frequency of the processor 220 may include the operations of determining a minimum frequency value of a clock signal applied to the processor 220 and driving the processor 220, based on a clock signal having a frequency greater than or equal to the determined frequency value. The clock signal may be output by a clock oscillation circuit provided inside or outside the processor 220.

According to an embodiment, the processor 220 may boost the frequency of the clock signal applied to at least one core of the plurality of cores 221, 222 and 223 included in the processor 220 according to the instruction set architecture (or a type of the instruction set architecture). For example, the processor 220 may boost the frequency value of the clock signal applied to each of the first core 221 (e.g., big core or big cluster) and the second core 222 (e.g., medium-sized core or medium-sized cluster). The processor 220 may boost the frequency value of the clock signal applied to each of the first core 221 (e.g., a big core or a big cluster), the second core 222 (e.g., medium-sized core or medium-sized cluster), and the third core 223 (e.g., little core or little cluster). Alternatively, the processor 220 may boost the frequency value of the clock signal applied to the second core 222 (e.g., medium-sized core or medium-sized cluster) or the third core 223 (e.g., little core or little cluster).

According to an embodiment, the processor 220 may determine the frequency value of the clock signal applied to at least one of the plurality of cores 221, 222 and 223 according to the instruction set architecture (or type of instruction set architecture). Also, the processor 220 may apply a clock signal having a frequency equal to or greater than the determined frequency value to at least one core of the plurality of cores 221, 222 and 223. In this case, the processor 220 may determine the frequency value using a table corresponding performance and power consumption of each of the plurality of cores 221, 222 and 223 to specific frequency values that depend on the type of the instruction set architecture.

Although the electronic device 201 is illustrated to include one processor in FIG. 2, the electronic device 201 may include a plurality of processors. That is, the electronic device 201 may include at least one processor, and the technical spirit of the disclosure may also be applied to the operations of boosting multiple processors.

According to an embodiment, the memory 230 may store data or information of the electronic device 201. For example, the memory 230 may store information on a table corresponding performance and power consumption of each of the plurality of cores 221, 222 and 223 to specific frequency values that depend on the type of the instruction set architecture.

Also, the memory 230 may store information about applications. The memory 230 may be implemented substantially the same as or similarly to the memory 130 of FIG. 1.

According to an embodiment, the display 260 may display data or information of the electronic device 201. For example, the display 260 may be implemented as a touch screen. The display 260 may be implemented substantially the same as or similarly to the display device 160 of FIG. 1.

Figure 3:
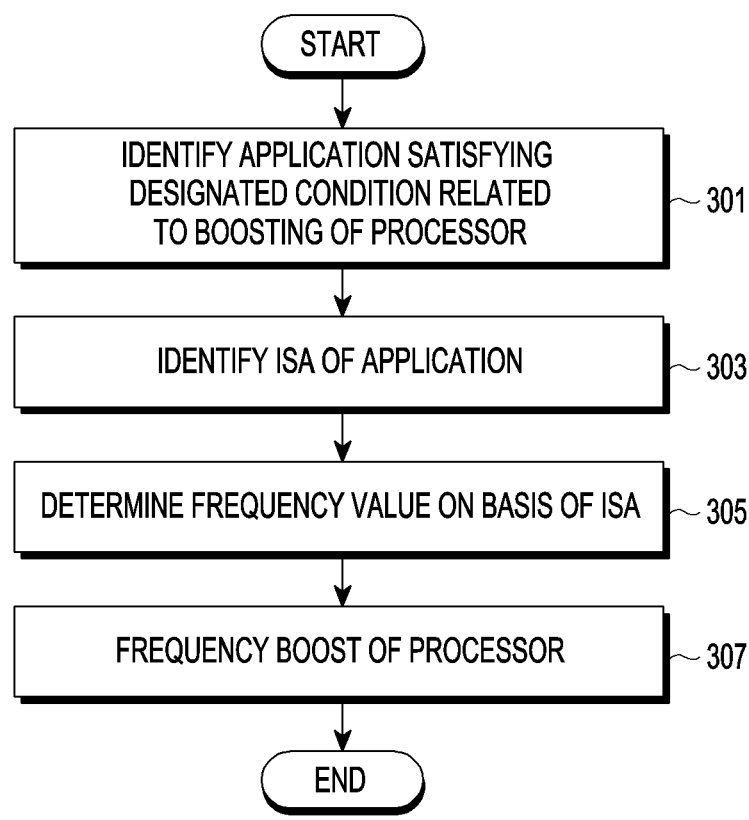
FIG. 3 is a flowchart illustrating an operation method of an electronic device according to an embodiment.

FIG. 3 is a flowchart illustrating an operation method of an electronic device according to an embodiment.

Referring to FIG. 3, according to an embodiment, a processor (the processor 220 of FIG. 2) may monitor a current workload, an execution state of one or more applications, etc. When a situation in which a boost is required is confirmed or detected, a boosting operation of the processor 220 may be started.

According to an embodiment, in operation 301, the processor 220 may identify an application that satisfies a designated condition related to the frequency boosting of the processor 220. For example, the application that satisfies the designated condition may indicate that an application is executed in a window activated in a display (display 260 of FIG. 2), an application is displayed at the top of the display 260 (e.g., the most recently used application among applications executed in each of a plurality of windows activated on the display 260), an application requires an immediate response, an application corresponds to the user's input, etc.

According to an embodiment, in operation 303, the processor 220 may identify the instruction set architecture (ISA) of the identified application. For example, the processor 220 may identify whether the instruction set architecture of the corresponding application is 32-bit or 64-bit instruction set architecture.

According to an embodiment, in operation 305, the processor 220 may determine a frequency value for boosting the processor 220, based on the instruction set architecture (or the type of the instruction set architecture).

According to an embodiment, in operation 307, the processor 220 may boost the frequency of the processor 220. For example, the processor 220 may apply a clock signal having a frequency equal to or greater than the determined frequency value to at least one core included in the processor 220. For example, each core inside the processor 220 may have a frequency (or a frequency value) determined according to the load currently being processed by the core, and when an event requiring the boosting operation occurs, the frequency (or frequency value) corresponding to the boosting operation may be determined separately from the state corresponding to the load being processed. In addition, the processor 220 may adjust the voltage so that each core can operate at the corresponding frequency. The processor 220 may cause at least one boosted core to process tasks of the corresponding application. For example, when the clock signal having the boosted frequency is applied to the first core (e.g., the first core 221 of FIG. 2), the processor 220 may control the first core 221 so that the task of the application that prompted the boosting operation is processed by the first core.

Figure 4:
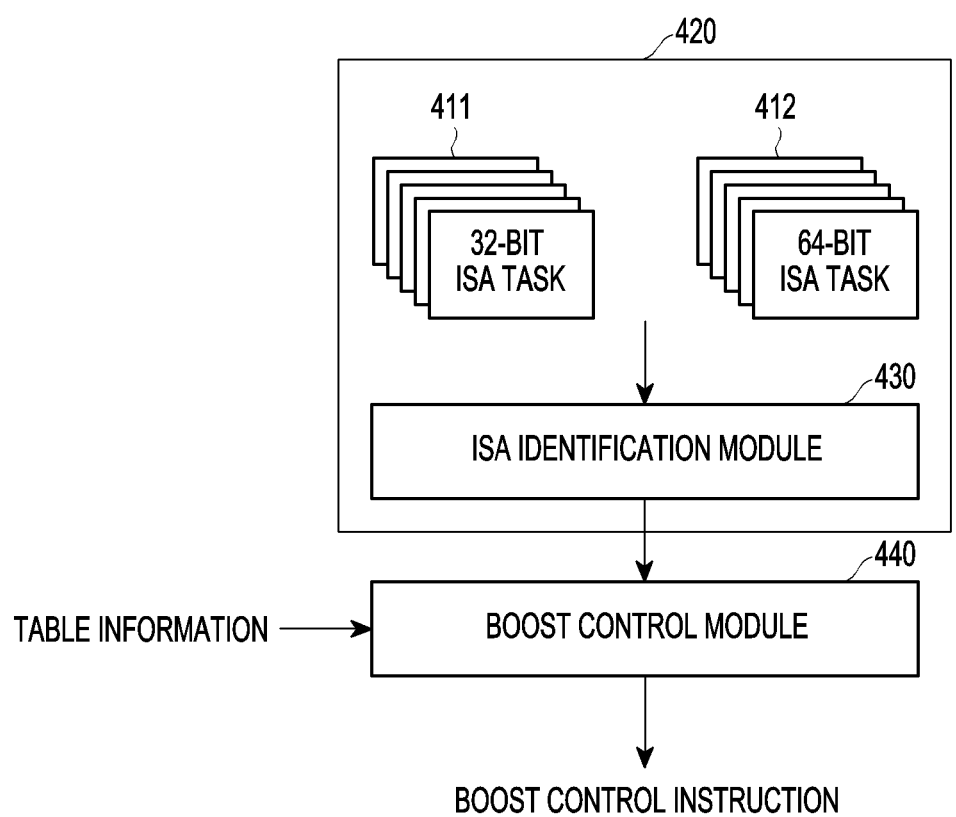
FIG. 4 is a block diagram illustrating an operation of an electronic device boosting a frequency of a processor according to an embodiment.

FIG. 4 is a block diagram illustrating an operation of an electronic device boosting a frequency of a processor according to an embodiment.

Referring to FIG. 4, the electronic device (e.g., the electronic device 201 of FIG. 2) may execute a scheduler 420 and a boost control module 440 by using a processor (e.g., the processor 220 of FIG. 2).

According to an embodiment, the scheduler 420 may control operations related to scheduling of applications executed in the electronic device 201. The scheduler 420 may identify the tasks 411 and 412 of the application. In addition, the scheduler 420 may identify the instruction set architecture of the tasks 411 and 412 of the application through an ISA identification module 430. That is, the ISA identification module 430 may identify the type of the instruction set architecture of the tasks 411 and 412 of the application. For example, the ISA identification module 430 may identify that the first tasks 411 have 32-bit instruction set architecture, and the second tasks 412 may have 64-bit instruction set architecture.

According to an embodiment, a boost control module 440 may obtain information on the type of the instruction set architecture of the tasks 411 and 412 identified by the ISA identification module 430.

According to an embodiment, the boost control module 440 may determine a frequency value of a clock signal applied to at least one core among a plurality of cores (e.g., 221, 222, and 223 of FIG. 2) according to the type of the instruction set architecture. At this time, the boost control module 440 may obtain table information corresponding to the identified type of the instruction set architecture. For example, the boost control module 440 may acquire 32-bit table information for a 32-bit task and 64-bit table information for a 64-bit task. In this case, the table information may include information about the performance and power consumption of each of the plurality of cores 221, 222 and 223 corresponding to specific frequency values for the particular type of the instruction set architecture. The boost control module 440 may determine a frequency value for boosting the driving frequency of at least one core included in the processor 220 using table information.

According to an embodiment, the boost control module 440 may output a boost control instruction for boosting the frequency of the processor 220. For example, the boost control instruction may include an instruction to control the processor 220 such that a clock signal having a frequency equal to or greater than the determined frequency value is applied to at least one core of the plurality of cores 221, 222 and 223.

Figure 5:
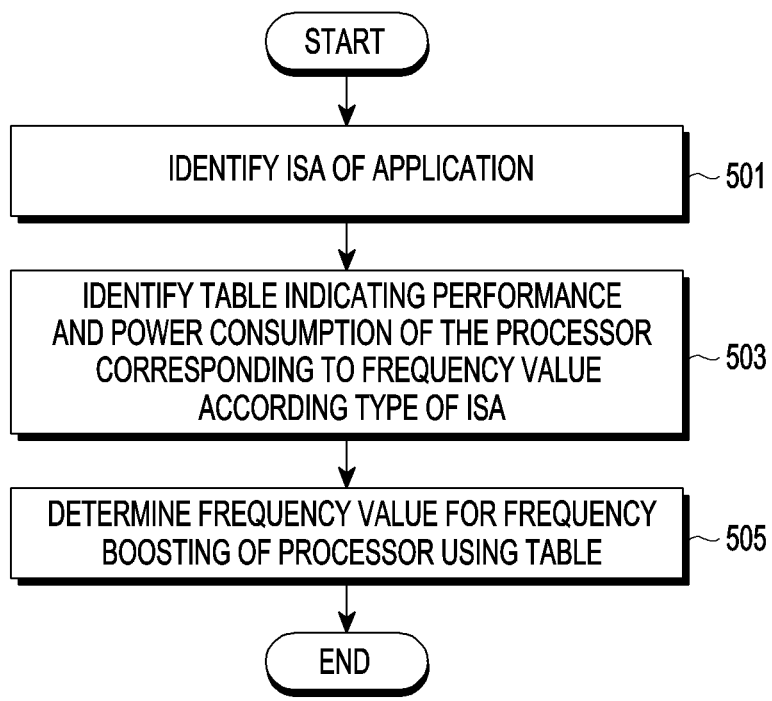
FIG. 5 is a flowchart illustrating an operation in which an electronic device determines a frequency value for boosting using a table according to an embodiment.

FIG. 5 is a flowchart illustrating an operation in which an electronic device determines a frequency value for boosting using a table according to an embodiment.

Referring to FIG. 5, according to an embodiment, a processor (the processor 220 of FIG. 2) may identify an application that satisfies a designated condition related to the frequency boosting of the processor 220. For example, when the application is identified, the processor 220 may start the operation for boosting the frequency of the processor 220.

According to an embodiment, in operation 501, the processor 220 may identify an instruction set architecture (ISA) of the corresponding application. For example, the processor 220 may identify whether the instruction set architecture of the application is the 32-bit instruction set architecture or the 64-bit instruction set architecture.

According to an embodiment, in operation 503, the processor 220 may identify a table indicating performance and power consumption of the processor corresponding to the frequency value according to the type of the identified instruction set architecture. For example, if the identified instruction set architecture is 32 bits, the processor 220 may obtain a table indicating performance and power consumption of the processor corresponding to frequency values for 32 bits. Alternatively, if the instruction set architecture is 64 bits, the processor 220 may obtain a table indicating performance and power consumption of the processor corresponding to frequency values for 64 bits. In this case, values included in the table for 32 bits and values included in the table for 64 bits may be different from each other.

According to an embodiment, in operation 505, the processor 220 may determine a frequency value for the frequency boost of the processor 220 using the obtained table (e.g., the table for 32 bits or the table for 64 bits). For example, the processor 220 may determine the frequency value for boosting the frequency of the processor 220, based on at least one of performance and power consumption included in the table. The operation of determining the frequency value will be described in detail with reference to FIGS. 6A and 6B below.

FIG. 6A is a table used by an electronic device to determine a frequency value for boosting according to an embodiment. FIG. 6B is a table used by an electronic device to determine a frequency value for boosting according to an embodiment.

Referring to FIG. 6A, according to an embodiment, the first table 601 may be a table showing performance and power consumption of a processor (e.g., the processor 220 of FIG. 2) corresponding to specific frequency values for 64-bit applications (or task of the application). Referring to FIG. 6B, according to an embodiment, the second table 602 may be a table indicating performance and power consumption of the processor 220 corresponding to specific frequency values for 32-bit applications (or task of the application). For example, values for performance and power consumption may be relative values.

According to an embodiment, when the frequency of the processor (e.g., the core included in the processor) is boosted to a particular frequency, the values (performance and power consumption) included in the first table 601 for 64 bits and the values (performance and power consumption) included in the second table 602 for 32 bits may be different from each other.

According to an embodiment, in the first table 601, when the big core (e.g., the first core 221 in FIG. 2) is boosted to a first frequency 610 (the frequency value is '819000' kHz), the performance may be '307', and the power consumption may be '193'. In addition, in the first table 601, when the medium-sized core (e.g., the second core 222 of FIG. 2) is boosted to a second frequency 620 (the frequency value is '1404000' kHz), the performance may be '311', and the power consumption may be '212'. In this case, the performance when the big core is boosted to the first frequency 610 may be a value similar to the performance when the medium-sized core is boosted to the second frequency 620. On the other hand, the power consumption when the big core is boosted to the first frequency 610 may be less than the power consumption when the medium-sized core is boosted to the second frequency 620.

According to an embodiment, referring to FIG. 6A, when the task of an application having a 64-bit ISA is performed, the processor 220 may boost the frequency of the big core in order to reduce power consumption while providing similar performance. At this time, the processor 220 may configure the minimum frequency of the clock signal to be 819000 kHz. That is, the processor 220 may apply a clock signal having a minimum frequency of 819000 kHz to the big core, and control the task of an application having a 64-bit ISA to be performed by the big core.

According to an embodiment, referring to FIG. 6B, in the second table 602, when the big core (e.g., the first core 221 in FIG. 2) is boosted to a third frequency 630 (the frequency value is '1378000' kHz), the performance may be '298', and the power consumption may be '277'. In addition, in the second table 602, when the medium-sized core (e.g., the second core 222 of FIG. 2) is boosted to a fourth frequency 640 (the frequency value is '140400' kHz), the performance may be '298', and the power consumption may be '201'. In this case, the performance when the big core is boosted to the third frequency 630 may be the same value as the performance when the medium-sized core is boosted to the fourth frequency 640. On the other hand, the power consumption when the big core is boosted to the third frequency 630 may be higher than the power consumption when the medium-sized core is boosted to the fourth frequency 640.

According to an embodiment, referring to FIG. 6B, when the task of an application having a 32-bit ISA is performed, the processor 220 may boost the frequency of the medium-sized core in order to reduce power consumption while providing the same performance. At this time, the processor 220 may configure the minimum frequency of the clock signal to be 1404000 kHz. That is, the processor 220 may apply a clock signal having a minimum frequency of 1404000 kHz to the medium-sized core, and control the task of an application having a 32-bit ISA to be performed by the medium-sized core.

According to an embodiment, when the instruction set architecture of the application is not considered, the processor 220 may apply a clock signal having the frequency value of '1404000' kHz or higher to the medium-sized core in order to boost its frequency. That is, the processor 220 may boost the frequency of the medium-sized core to '1404000' kHz, regardless of whether an application having 64-bit ISA or an application having 32-bit ISA is executed. But in that case, the 64-bit application may consume more power than when the instant disclosure is applied. That is, the disclosure has the effect of reducing power consumption while providing similar performance.

Figure 7B:
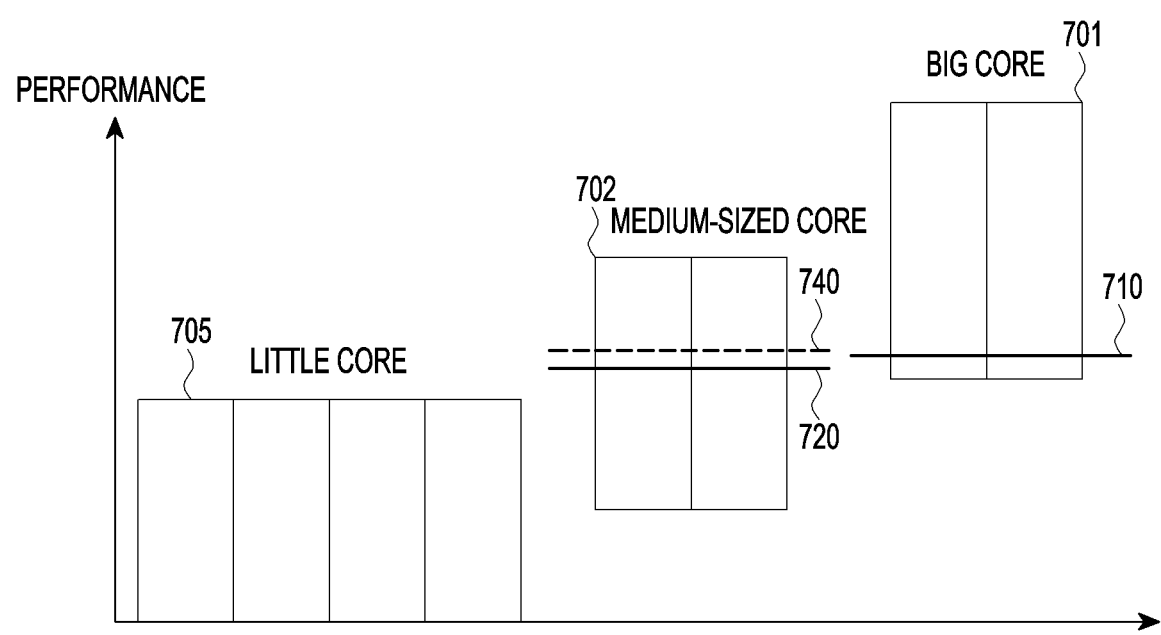
FIG. 7B is a graph illustrating frequency boosting of each of the cores included in the processor according to an embodiment.

FIG. 7A is a table for frequency boosting of each of the cores included in the processor, according to an embodiment. FIG. 7B is a graph illustrating frequency boosting of each of the cores included in the processor according to an embodiment.

Referring to FIG. 7A, according to an embodiment, when a processor (the processor 220 of FIG. 2) boosts a big core (e.g., the first core 221 in FIG. 2) with a frequency value on the leftmost side of a table 700, a medium-sized core (e.g., the second core 222 in FIG. 2), and a little core (e.g., the third core 223 in FIG. 2) may also be boosted simultaneously with a corresponding frequency. For example, if the big core is boosted to '2340000' kHz, the medium-sized core may be boosted to '2314000' kHz and the little core may also be boosted to '1950000' kHz. Alternatively, if the big core is boosted to '2080000' kHz, the medium-sized core may be boosted to '2210000' kHz. At this time, the little core may not be boosted. For example, the table 700 may be a table showing the association of the boosting between the big core and other cores (e.g., medium-sized core and little core) when the big core is boosted to a specific frequency.

According to an embodiment, when the medium-sized core is boosted, the big core and the little core may not be boosted in connection with the medium-sized core. Likewise, if the little core is boosted, the big core and medium-sized core may not be boosted in association with the little core. That is, only when the big core is boosted, as shown in the table 700 of FIG. 7A, the medium-sized core and the little core can be linked and boosted.

FIGS. 7A and 7B, according to an embodiment, when the big core 701 is boosted to the first frequency 710 (the frequency value is '819000' kHz), the medium-sized core 702 may be boosted to the second frequency 720 (frequency value is '1222000' kHz) at the same time. At this time, the little core 705 may not be boosted based at the third frequency 730 (the frequency value is '0'). On the other hand, if the medium-sized core 702 is boosted to the fourth frequency (the frequency value is '1404000' kHz), only the medium-sized core 702 may be boosted and the other cores 701 and 705 may not be affected.

Referring to FIG. 7B, according to an embodiment, when the big core 701 is boosted to the first frequency 710 (the frequency value is '819000' kHz), the medium-sized core is also boosted to the second frequency 720 (frequency value is '1222000' kHz), and thus boosting the big core 701 may be advantageous in terms of performance when dealing with tasks with heavy workloads. On the other hand, when the medium-sized core 702 is boosted to the fourth frequency 740 (the frequency value is '1404000' kHz), only the medium-sized core 702 is boosted without affecting the other cores 701 and 705, so boosting the medium-sized core 702 may be somewhat disadvantageous in terms of performance when dealing with tasks with heavy workloads. That is, the disclosure has an advantageous effect when processing a task having heavy workload in terms of performance with similar power consumption.

According to an embodiment, the big core 701 may include two cores, the medium-sized core 702 may include two cores, and the little core 705 may include four cores. However, the number of cores is only exemplary, and the technical spirit of the disclosure may not be limited thereto.

Meanwhile, the values shown in FIGS. 6A, 6B, 7A, and 7B are illustratively reflected, and the technical spirit of the disclosure may not be limited thereto.

Figure 8:
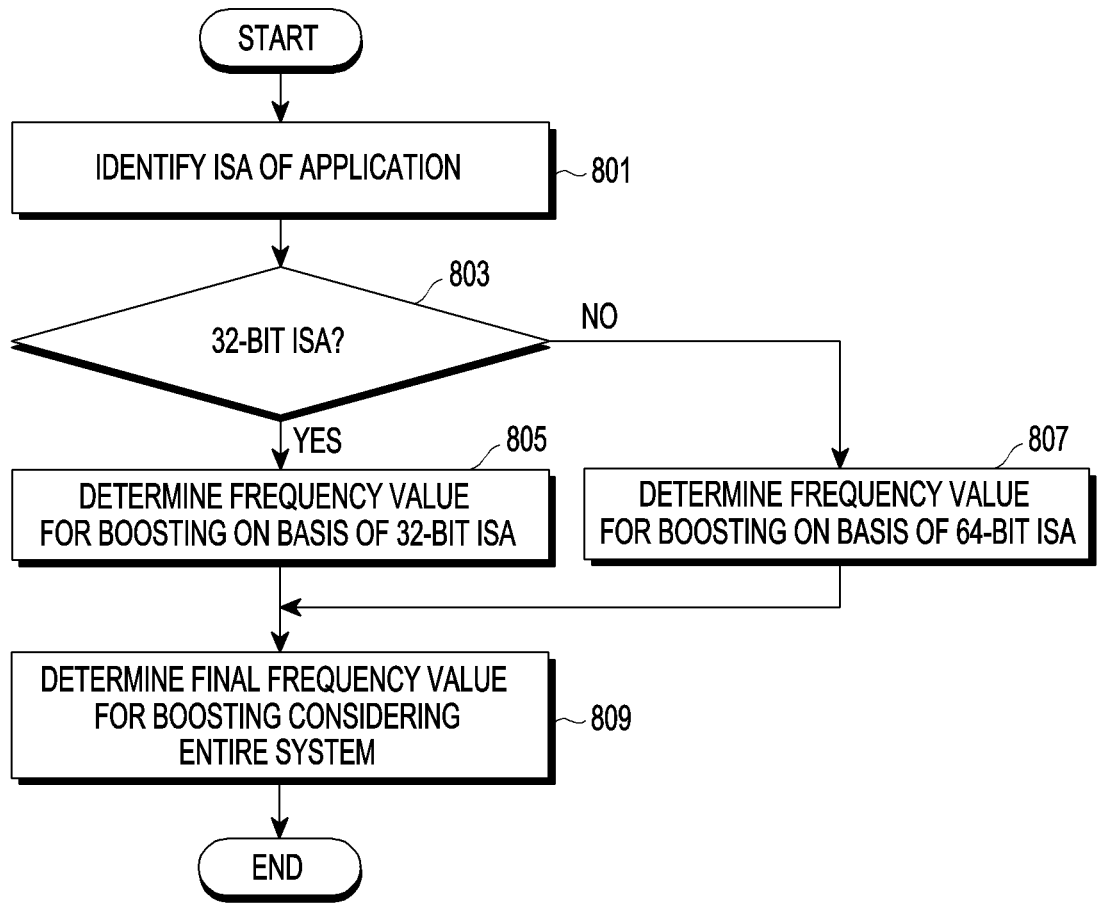
FIG. 8 is a flowchart illustrating an operation in which an electronic device determines a frequency value for boosting of a processor according to an embodiment.

FIG. 8 is a flowchart illustrating an operation in which an electronic device determines a frequency value for boosting of a processor according to an embodiment.

Referring to FIG. 8, according to an embodiment, in operation 801, the processor (processor 220 of FIG. 2) may identify the instruction set architecture (ISA) of the application. For example, the application may be an application that provides content on the screen or animation operation such as the application displayed at the top of the display (e.g., the display 260 of FIG. 2), an application requiring immediate response, or an application requiring a heavy workload.

According to an embodiment, in operation 803, the processor 220 may identify or determine whether the instruction set architecture of the application is the 32-bits instruction set architecture.

According to an embodiment, in operation 805, if the instruction set architecture of the application is the 32-bit instruction set architecture, the processor 220 may obtain 32-bit table information based on the 32-bit instruction set architecture to determine the frequency value for boosting.

According to an embodiment, in operation 807, if the instruction set architecture of the application is the 64-bit instruction set architecture rather than a 32-bit instruction set architecture, the 64-bit table information may be obtained based on the 64-bit instruction set architecture to determine the frequency value for boosting.

According to an embodiment, in operation 809, the processor 220 may determine the final frequency value for boosting the frequency of the processor 220 in consideration of the entire system. For example, the processor 220 may determine a final frequency value in consideration of the user's interaction and/or the state of the electronic device 201 and the like. The method of determining the final frequency value will be described in more detail in FIGS. 9 and 10.

According to an embodiment, when a scroll or drag operation by the user's touch input, activity switching or an alarm, etc., is received, the processor 220 may perform boosting according to the above-described operation method when the boost is required. The boost may further be required for badge update, content loading, etc.

Figure 9:
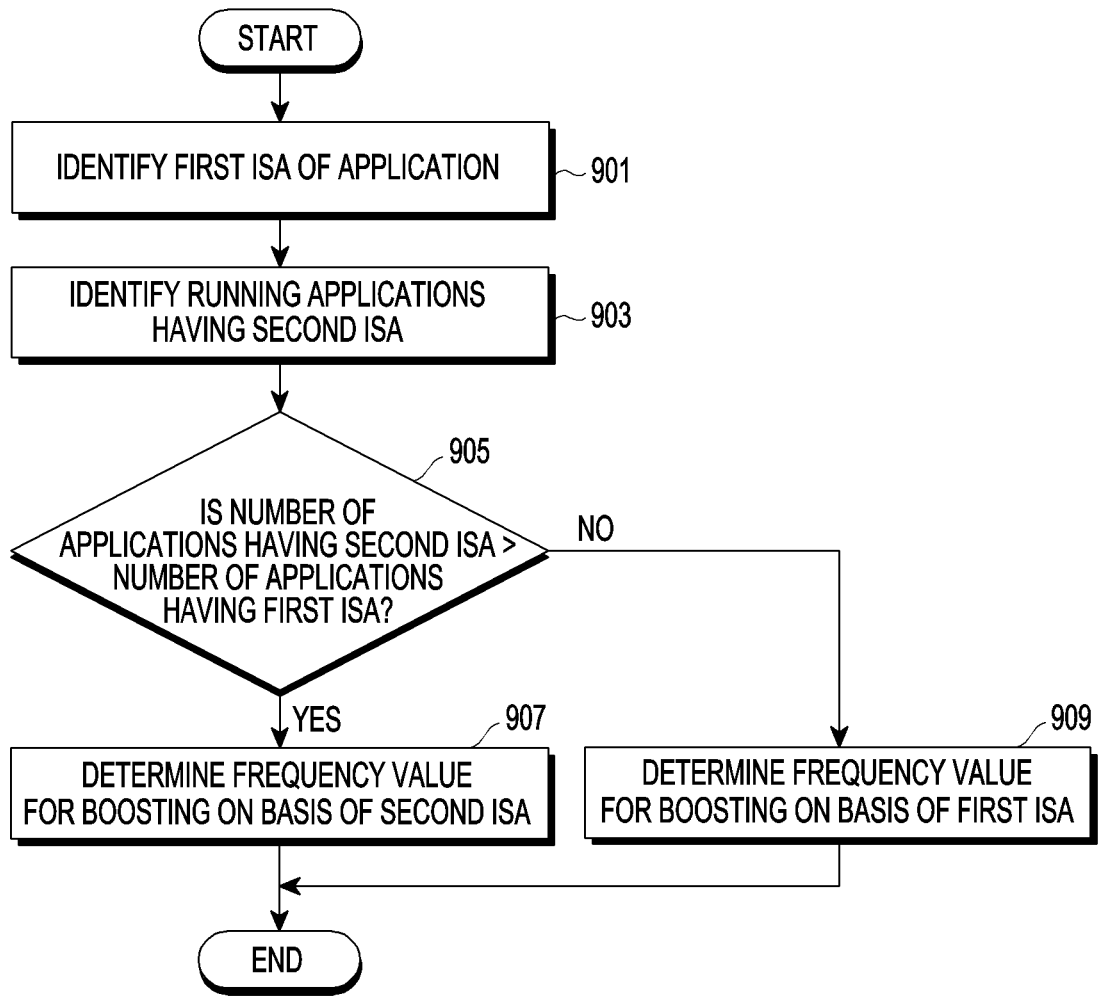
FIG. 9 is a flowchart illustrating an operation in which an electronic device determines a frequency value for boosting a processor according to an embodiment.

FIG. 9 is a flowchart illustrating an operation in which an electronic device determines a frequency value for boosting a processor according to an embodiment.

Referring to FIG. 9, according to an embodiment, the processor (processor 220 of FIG. 2) may execute one or more applications. In operation 901, when the frequency boost operation of the processor 220 starts, the first instruction set architecture (ISA) of the application may be identified. For example, the processor 220 may identify (or determine) whether the first instruction set architecture is 32 bits or 64 bits. For example, among a plurality of applications, the application may be an application that satisfies the designated condition related to boosting.

According to an embodiment, in operation 903, the processor 220 may identify second applications having a second type of instruction set architecture different from the first instruction set architecture among the plurality of applications being executed. In addition, the processor 220 may also identify first applications having the first instruction set architecture among the plurality of running applications. For example, if the first instruction set architecture is 32 bits, the second instruction set architecture may be 64 bits.

According to an embodiment, in operation 905, the processor 220 may compare the number of first applications having the first instruction set architecture and the number of second applications having the second instruction set architecture. For example, the processor 220 may identify whether the number of second applications is greater than the number of first applications.

According to an embodiment, if the number of the second applications is greater than the number of the first applications (YES in 905), in operation 907, the processor 220 may determine the frequency value for the frequency boost of the processor 220, based on the second instruction set architecture rather than the first instruction set architecture. This is because, when considering the entire system, it is more effective to boost the frequency of the processor 220 in consideration of the more commonly executed type of instruction set architecture.

According to an embodiment, if the number of second applications is not greater than the number of first applications (No in 905), in operation 909, the processor 220 may determine the frequency value for the boosting, based on the first instruction set architecture.

According to an embodiment, in operation 905, when the processor 220 compares the number of the first applications with the number of the second applications, the processor 220 may assign weights to specific applications. For example, an application requiring an immediate response may be assigned a weight of 2 or 3, and the processor 220 may compare the number of the first applications and the number of the second applications after these weights are taken into account. For example, the weight may be configured automatically by the processor 220 or may be configured by a user.

Figure 10:
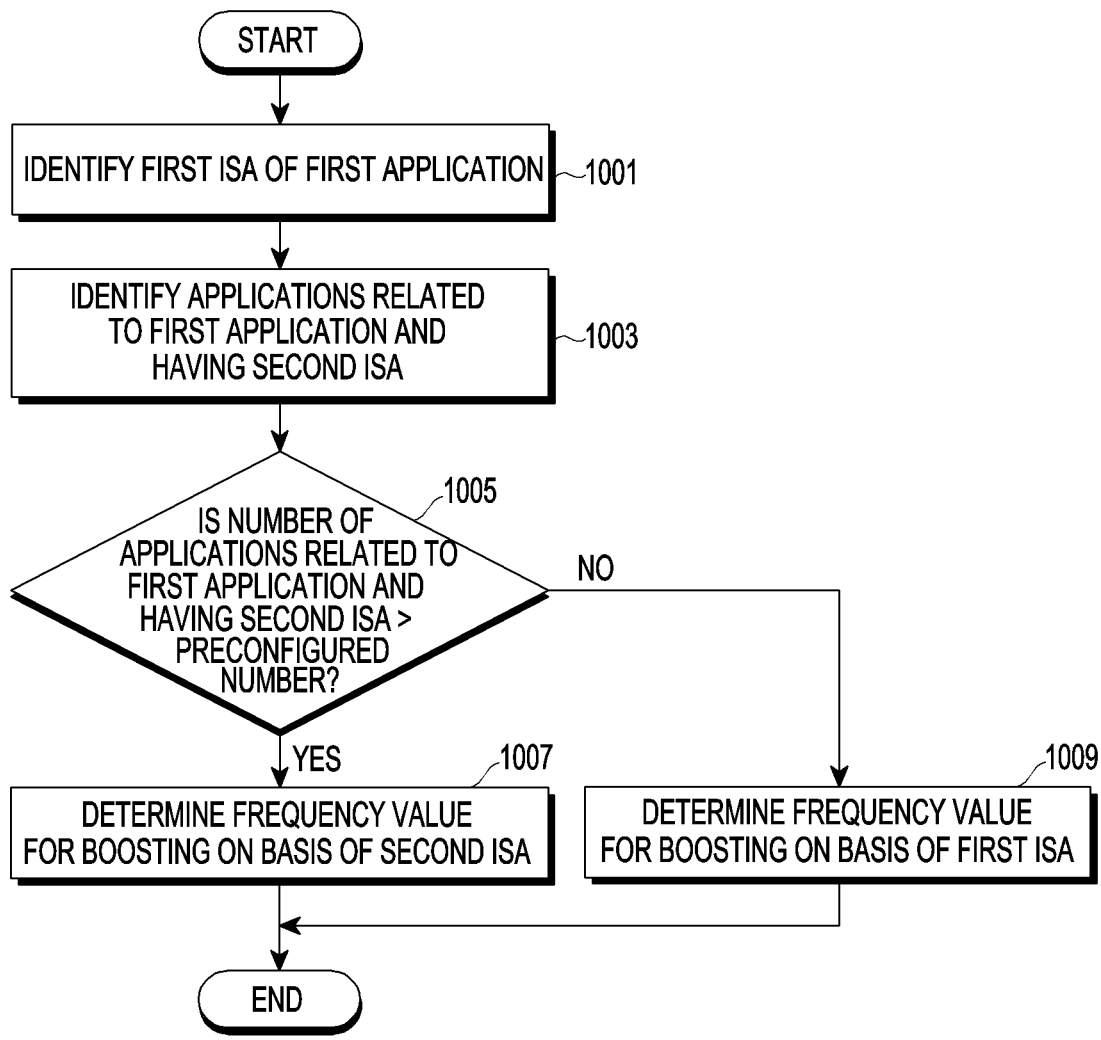
FIG. 10 is a flowchart illustrating an operation in which an electronic device determines a frequency value for boosting a processor according to an embodiment.

FIG. 10 is a flowchart illustrating an operation in which an electronic device determines a frequency value for boosting a processor according to an embodiment.

Referring to FIG. 10, the processor (the processor 220 of FIG. 2) may execute one or more of applications. In operation 1001, when the frequency boost operation of the processor 220 is started, the first instruction set architecture (ISA) of a first application may be identified. For example, the processor 220 may identify (or determine) whether the first instruction set architecture is 32 bits or 64 bits. For example, among a plurality of applications, the first application may be an application that satisfies a designated condition related to boosting.

According to an embodiment, in operation 1003, the processor 220 may identify second applications related to the first application and having the second type of instruction set architecture different from the first instruction set architecture. For example, when the first application is a camera application, the processor 220 may identify whether tasks related to the operation of the camera application, such as a system server and a camera hardware abstraction layer (HAL), have the second instruction set architecture. For example, if the first instruction set architecture is 32 bits, the second instruction set architecture may be 64 bits.

According to an embodiment, in operation 1005, the processor 220 may identify the number of second applications having the second instruction set architecture among the second applications related to the first application. For example, the processor 220 may identify whether the number of second applications having the second instruction set architecture is greater than the preset number. For example, the preconfigured number may be configured automatically by the processor 220 or may be configured by a user.

According to an embodiment, if the number of the second applications having the second instruction set architecture is greater than the preset number (YES in operation 1005), in operation 1007, the processor 220 may determine a frequency value for the frequency boost of the processor 220, based on the second instruction set architecture rather than the first instruction set architecture. This is because, when considering the entire system, it is more effective to boost the frequency of the processor 220 in consideration of the more commonly executed type of instruction set architecture.

According to an embodiment, if the number of the second applications having the second instruction set architecture is not greater than the preset number (NO in operation 1005), in operation 1009, the processor 220 may determine a frequency value for boosting, based on the type of the first instruction set architecture.

FIGS. 9 and 10 illustrate embodiments of performing a frequency boosting of a processor, based on the type of instruction set architecture in consideration of the entire system. In this regard, the technical spirit of the disclosure is not limited to the above-described embodiments, and various other methods that can consider the entire system can be applied.

Figure 11A:
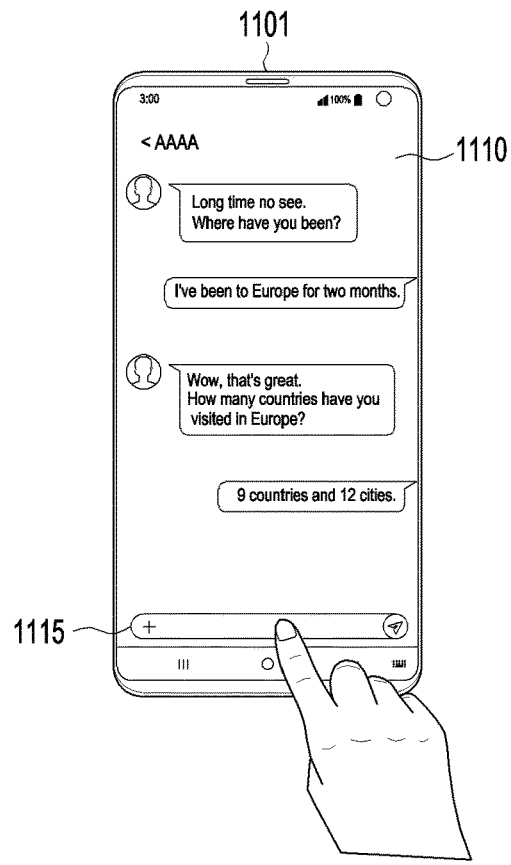
FIG. 11A is a user interface for describing an operation in which an electronic device determines a frequency value for boosting according to an embodiment.
Figure 11B:
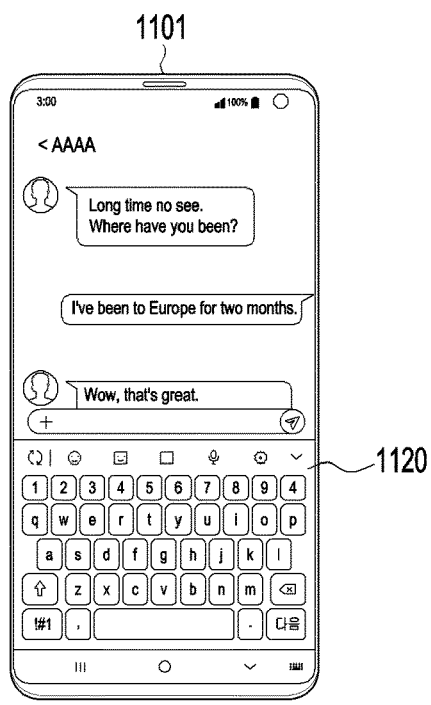
FIG. 11B is a user interface for describing an operation in which an electronic device determines a frequency value for boosting according to an embodiment.

FIG. 11A is a user interface for describing an operation in which an electronic device determines a frequency value for boosting according to an embodiment. FIG. 11B is a user interface for describing an operation in which an electronic device determines a frequency value for boosting according to an embodiment.

Referring to FIG. 11A, according to an embodiment, the electronic device 1101 (e.g., the electronic device 201 of FIG. 2) may execute a messenger application. For example, the electronic device 1101 may display the messenger screen 1110 through a display (e.g., the display 260 of FIG. 2). For example, the messenger application may have the first instruction set architecture.

According to an embodiment of the disclosure, the electronic device 1101 may receive the user's touch input to the conversation input window 1115 while the messenger application is being executed.

Referring to FIG. 11B, according to an embodiment, the electronic device 1101 may execute a keyboard application in response to the user's touch input to the conversation input window 1115. For example, the keyboard application may be an application requiring immediate response. The electronic device 1101 may boost the frequency of a processor (e.g., the processor 220 of FIG. 2) for the quick response of the keyboard application. That is, the electronic device 1101 may boost the frequency of the processor 220 to quickly display the keyboard screen 1120 for the keyboard application. For example, the keyboard application may have the second type of instruction set architecture different from the first instruction set architecture. For example, if the messenger application has a 64-bit instruction set architecture, the keyboard application may have a 32-bit instruction set architecture.

According to an embodiment, the electronic device 1101 may boost the frequency of the processor 220, based on either the 64-bit instruction set architecture and the 32-bit instruction set architecture. For example, since the keyboard application is configured as an application that requires an immediate response, the electronic device 1101 may boost the frequency of the processor 220, based on the instruction set architecture (e.g., 32 bits) of the keyboard application. That is, the electronic device 1101 may determine the frequency value for the frequency boost of the processor 220 using 32-bit table information. Also, the electronic device 1101 may control at least one core to which frequency boosting is applied among a plurality of cores included in the processor 220 to process a task of the keyboard application.

Figure 12:
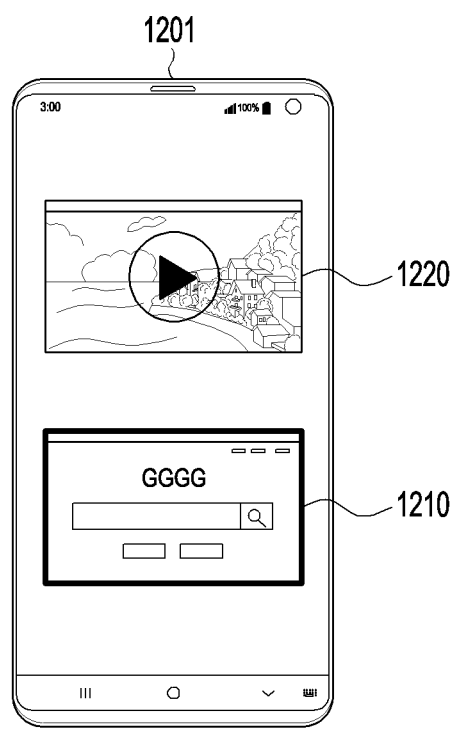
FIG. 12 illustrates a user interface for describing an operation of an electronic device to determine a frequency value for boosting according to an embodiment.

FIG. 12 illustrates a user interface for describing an operation of an electronic device to determine a frequency value for boosting according to an embodiment.

Referring to FIG. 12, according to an embodiment, the electronic device 1201 (e.g., the electronic device 201 of FIG. 2) may execute a plurality of (e.g., two) applications in a multi-window environment. For example, the electronic device 1201 may display two windows 1210 and 1220 through a display (e.g., the display 260 of FIG. 2). In the first window 1210, the execution screen of the first application may be displayed, and in the second window 1220, the execution screen of the second application may be displayed. For example, the first application may have the first type of instruction set architecture, and the second application may have the second type of instruction set architecture different from the first type. For example, the first application (e.g., web search application) may have a 32-bit instruction set architecture, and the second application (e.g., video application) may have a 64-bit instruction set architecture.

According to an embodiment, the electronic device 1201 may boost the frequency of the processor 220, based on the instruction set architecture of the application corresponding to any one of the plurality of windows. That is, the electronic device 1201 may boost the frequency of the processor 220, based on the 64-bit instruction set architecture or the 32-bit instruction set architecture.

According to an embodiment, the electronic device 1201 may identify a currently active window among the plurality of windows. For example, the electronic device 1201 may identify the activated first window 1210. The electronic device 1201 may boost the frequency of the processor 220, based on the type (e.g., 32 bits) of the instruction set architecture of the first application corresponding to the first window 1210. That is, the electronic device 1101 may determine the frequency value for the frequency boost of the processor 220 using 32-bit table information. Also, the electronic device 1201 may control at least one core to which frequency boosting is applied among the plurality of cores included in the processor 220 to process the task of the first application. At this time, the task of the second application may not be processed by at least one core to which frequency boost is applied.

According to an embodiment, the electronic device 1201 may identify an application corresponding to a user input received through a touch screen (e.g., the display 260 of FIG. 2) among the plurality of windows. For example, when the user input is received by the first window 1210, the electronic device 1201 may boost the frequency of the processor 220, based on the type (e.g., 32 bits) of the instruction set architecture of the first application corresponding to the first window 1210. That is, the electronic device 1101 may determine the frequency value for the frequency boost of the processor 220 using 32-bit table information. Also, the electronic device 1201 may control at least one core to which frequency boosting is applied among the plurality of cores included in the processor 220 to process the task of the first application. At this time, the task of the second application may not be processed by at least one core to which frequency boosting is applied.

An electronic device according to an embodiment includes a display, and a processor including a plurality of cores, wherein the processor is configured to identify a first application satisfying a designated condition related to boosting of the processor among at least one application running on the electronic device, identify a first instruction set architecture (ISA) of the first application, and boost a frequency of a clock signal applied to at least one core among the plurality of cores included in the processor according to the first instruction set architecture.

The processor may be configured to determine a frequency value for boosting the at least one core according to the first instruction set architecture, and control the at least one core to be driven using the clock signal having the frequency equal to or greater than the frequency value.

The processor may be configured to determine the frequency value using a table corresponding performance and power consumption of each of the plurality of cores to specific frequency values according to a type of instruction set architecture.

The processor may be configured to determine an application displayed on top of the display among the at least one application as the first application when the at least one application includes applications having different types of instruction set architecture.

The processor may be configured to identify a second instruction set architecture of a second application and boost the frequency of the clock signal, based on the second instruction set architecture when the second application is displayed on the top of the display.

The processor may be configured to determine an application requiring an immediate response among the at least one application as the first application when the at least one application includes applications having different types of instruction set architectures.

The processor may be configured to determine an application corresponding to a user input received through the display among the at least one application as the first application when the at least one application includes applications having different types of instruction set architectures.

The processor may be configured to identify an activated window and determine an application corresponding to the activated window among the at least one application as the first application when a plurality of applications are executed in a plurality of windows.

The processor may be configured to boost the frequency of the clock signal based on the second instruction set architecture when a number of applications having the second instruction set architecture different from the first instruction set architecture among the at least one application is greater than the number of applications having a first instruction set architecture.

The processor may be configured to boost the frequency of the clock signal based on the second instruction set architecture when a number of applications having the second instruction set architecture different from the first instruction set architecture and related to the first application is greater than a predetermined number.

The first instruction set architecture may be 32-bits instruction set architecture or 64-bits instruction set architecture.

An operation method of an electronic device according to an embodiment may include identifying a first application satisfying a designated condition related to boosting of a processor among at least one application running on the electronic device, identifying a first instruction set architecture (ISA) of the first application, and boosting a frequency of a clock signal applied to at least one core among a plurality of cores included in the processor of the electronic device according to the first instruction set architecture.

The boosting of the frequency of the clock signal may include determining a frequency value for boosting the at least one core according to the first instruction set architecture, and controlling the at least one core to be driven using the clock signal having the frequency equal to or greater than the frequency value.

The determining of the frequency value may further include determining the frequency value using a table corresponding performance and power consumption amount of each of the plurality of cores to specific frequency values according to a type of instruction set architecture.

The identifying of the first application may include determining an application displayed on top of a display of the electronic device among the at least one application as the first application when the at least one application includes applications having different types of instruction set architectures.

The operation method of an electronic device may further include identifying a second instruction set architecture of a second application when the second application is displayed on the top of the display, and boosting the frequency of the clock signal, based on the second instruction set architecture.

The identifying of the first application may include determining an application requiring an immediate response among the at least one application as the first application when the at least one application includes applications having different types of instruction set architectures.

The boosting of the frequency of the clock signal may include boosting the frequency of the clock signal based on the second instruction set architecture when a number of applications having the second instruction set architecture different from the first instruction set architecture among the at least one application is greater than a number of applications having the first instruction set architecture.

The boosting of the frequency of the clock signal may further include boosting the frequency of the clock signal based on the second instruction set architecture when a number of applications having the second instruction set architecture different from the first instruction set architecture and related to the first application is greater than a predetermined number.

A computer-readable recording medium according to an embodiment may store a program to execute operations of identifying a first application satisfying a designated condition related to boosting of a processor among at least one application running on an electronic device, identifying a first instruction set architecture (ISA) of the first application, and boosting a frequency of a clock signal applied to at least one core among a plurality of cores included in the processor of the electronic device according to the first instruction set architecture.

Each of the above-described components of the electronic device may include one or more parts and the name of the component may vary with the type of the electronic device.

According to various embodiments, the electronic device may be configured to include at least one of the above-described components. Some components may be omitted from or added to the electronic device. According to various embodiments, one entity may be configured by combining a part of the components of the electronic device, to thereby perform the same functions of the components prior to the combining.

Embodiments disclosed herein are provided merely to easily describe technical details of the disclosure and to assist in the understanding of the disclosure, and are not intended to limit the scope of the disclosure. Therefore, it should be construed that all modifications and changes or various other embodiments based on the technical idea of various embodiments of the disclosure fall within the scope of various embodiments of the disclosure.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device comprising:
    a memory;
    a display; and
    a processor including first, second and third types of cores,
    wherein the processor is configured to:
        identify a first application satisfying a designated condition related to boosting of the processor among at least one application running on the electronic device;
        identify a first instruction set architecture (ISA) of the first application;
        identify a first number of one or more applications running on the electronic device and having the first instruction set architecture and a second number of one or more applications running on the electronic device and having a second instruction set architecture different from the first instruction set architecture;
        based on a comparison of the first number and the second number, identify, from among a plurality of tables stored in the memory, one of a table corresponding to a type of the first instruction set architecture and another table corresponding to a type of the second instruction set architecture, each of the plurality of tables including performance values, power consumption values and frequency values of the first, second and third types of cores; and
        boost a frequency of a clock signal applied to at least one core among the first, second and third types of cores included in the processor to a first frequency using the identified table to execute at least one task of the first application, while another one among the first, second and third types of cores included in the processor executes another task at a second frequency, different from the first frequency, wherein the at least one core has a first performance level, and wherein the another one among the first, second and third types of cores has a second performance level, different from the first performance level,
    wherein the plurality of tables provides the performance values and the power consumption values for different frequencies of the clock signal for each of the first, second and third types of cores for each ISA of the first ISA and a second ISA.

2. The electronic device of claim 1, wherein the processor is configured to:
    determine the first frequency for boosting the at least one core according to the first instruction set architecture; and
    control the at least one core to be driven using the clock signal having the frequency boosted to the first frequency.

3. The electronic device of claim 1, wherein the processor is configured to determine an application displayed on top of the display among the at least one application as the first application when the at least one application includes applications having different types of instruction set architecture.

4. The electronic device of claim 3, wherein the processor is configured to identify the second instruction set architecture of a second application and boost the frequency of the clock signal, based on the second instruction set architecture when the second application is displayed on the top of the display.

5. The electronic device of claim 1, wherein the processor is configured to determine an application requiring an immediate response among the at least one application as the first application when the at least one application includes applications having different types of instruction set architectures.

6. The electronic device of claim 1, wherein the processor is configured to determine an application corresponding to a user input received through the display among the at least one application as the first application when the at least one application includes applications having different types of instruction set architectures.

7. The electronic device of claim 1, wherein the processor is configured to identify an activated window and determine an application corresponding to the activated window among the at least one application as the first application when a plurality of applications are executed in a plurality of windows.

8. The electronic device of claim 1, wherein the processor is configured to boost the frequency of the clock signal based on the second instruction set architecture different from the first instruction set architecture when the second number is greater than the first number.

9. The electronic device of claim 1, wherein the first instruction set architecture is 32-bits instruction set architecture or 64-bits instruction set architecture.

10. The electronic device of claim 1, wherein the designated condition is satisfied when the first application is a keyboard application.

11. A method in an electronic device, the method comprising:
    identifying a first application satisfying a designated condition related to a frequency of a clock signal applied to at least one core among first, second and third types of cores included in a processor of the electronic device;

identifying an instruction set architecture (ISA) of the first application;

identifying a first number of one or more applications running on the electronic device and having a first ISA and a second number of one or more applications running on the electronic device and having a second ISA different from the first ISA;

based on a comparison of the first number and the second number, identifying a table from among a plurality of tables, each of the plurality of tables including performance values, power consumption values and frequency values of the first, second and third types of cores, wherein the table is a first table corresponding to a type of the first ISA when the ISA of the first application is the first ISA, wherein the table correlates at least one frequency to a first performance, and a first power consumption, and the table is a second table corresponding to a type of the second ISA when the ISA of the first application is the second ISA, and wherein the second table correlates the at least one frequency to a second performance different from the first performance, and a second power consumption different from the first power consumption; and determining a frequency value for boosting the frequency of the clock signal, based on the identified table, and boosting the clock signal of the at least one core among the first, second and third types of cores to the frequency value to execute at least one task of the first application, while executing another task by another one of the first, second and third types of cores at another frequency value;

wherein the designated condition is satisfied when the first application is a keyboard application.

12. The method of claim 11, further comprising:

identifying the second ISA of a second application when the second application is displayed on top of a display; and boosting the frequency of the clock signal, based on the second ISA.

13. The method of claim 11, wherein boosting of the frequency of the clock signal further comprises boosting the frequency of the clock signal based on the second ISA different from the first ISA when the second number of applications is greater than the first.

14. A non-transitory computer-readable recording medium capable of storing a program to execute operations of:

identifying a first application satisfying a designated condition related to boosting of a processor among at least one application running on an electronic device;

identifying a first instruction set architecture (ISA) of the first application;

identifying a first number of one or more applications running on the electronic device and having the first instruction set architecture and a second number of one or more applications running on the electronic device and having a second instruction set architecture different from the first instruction set architecture;

based on a comparison of the first number and the second number, identifying, from among a plurality of tables stored in a memory of the electronic device, one of a table corresponding to a type of the first instruction set architecture and another table corresponding to a type of the second instruction set architecture, each of the plurality of tables including performance values, power consumption values and frequency values of first, second and third types of cores; and boosting a frequency of a clock signal applied to at least one core among the first, second and third types of cores included in the processor of the electronic device to a first frequency using the identified table to execute at least one task of the first application, while at least another one among the first, second and third types of cores included in the processor executes another task at a second frequency, different from the first frequency, wherein the at least one core has a first performance level, and wherein the at least another one among the first, second and third types of cores has a second performance level, different from the first performance level, wherein the plurality of tables provide the performance values and the power consumption values for different frequencies of the clock signal for each of the first, second and third types of cores for each ISA of the first ISA and a second ISA.

15. The non-transitory computer-readable recording medium of claim 14, wherein the designated condition is satisfied when the first application is a keyboard application.

* * * * *